June 13, 1944.                F. A. KAMAN                 2,351,049
                              SQUEEZE RIVETER
                          Filed Dec. 26, 1941            2 Sheets-Sheet 1
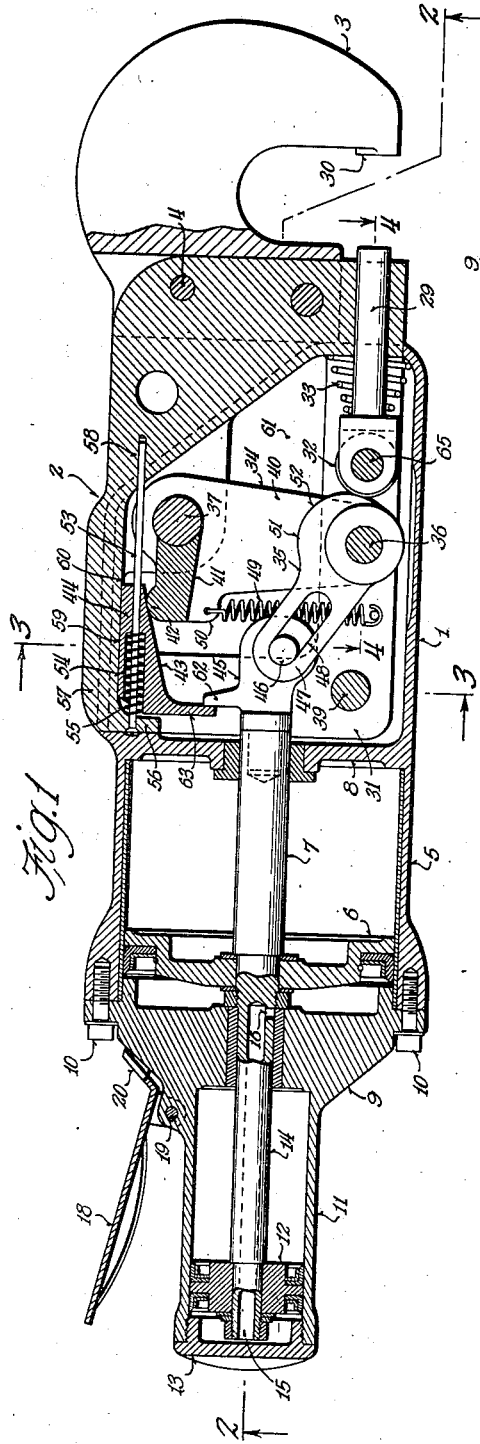
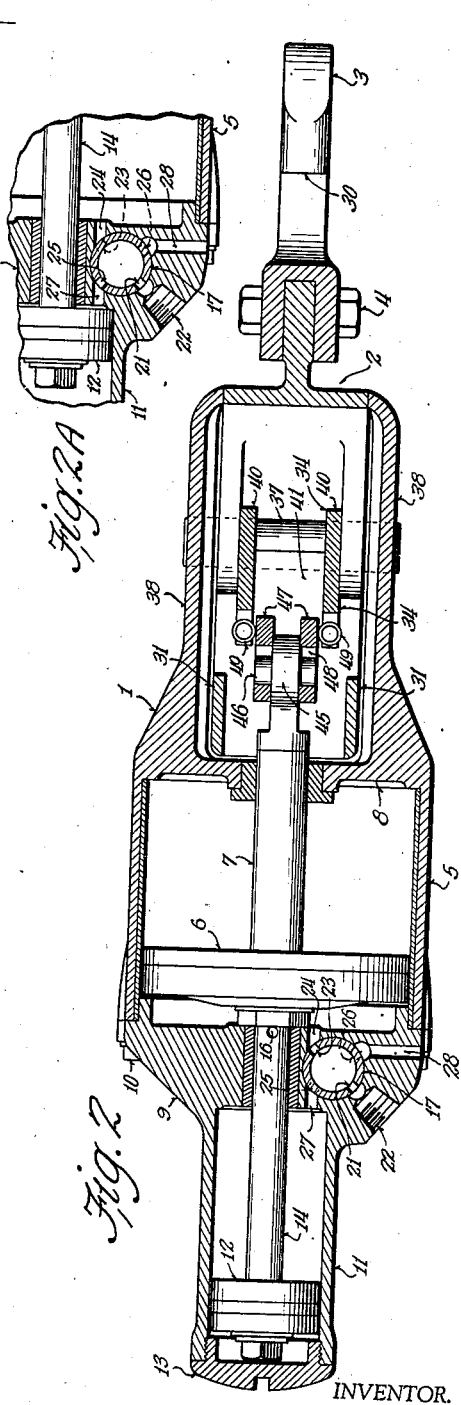
INVENTOR.
FRANK A. KAMAN
BY
ATTORNEY.

June 13, 1944.   F. A. KAMAN   2,351,049
SQUEEZE RIVETER
Filed Dec. 26, 1941   2 Sheets-Sheet 2
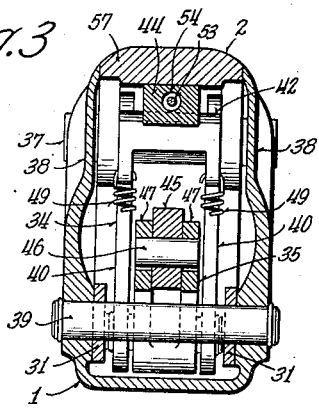
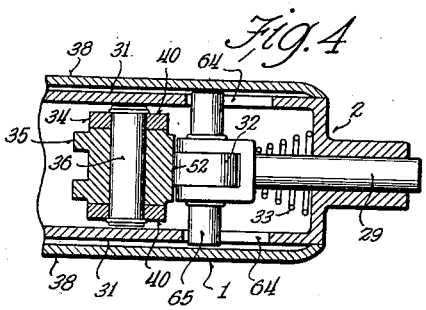
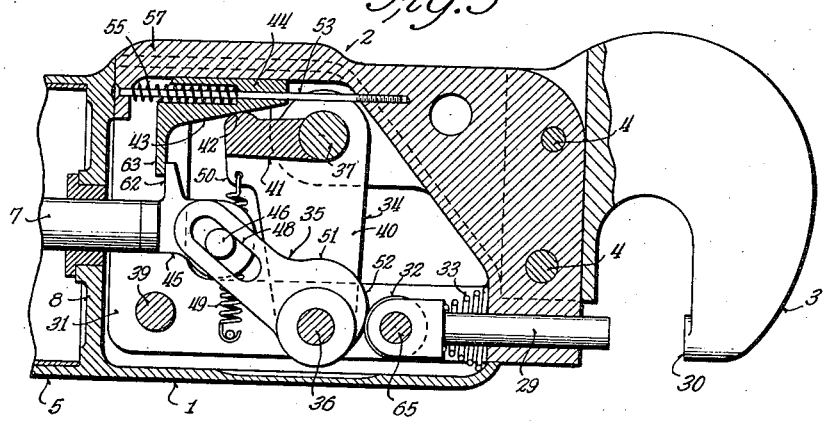
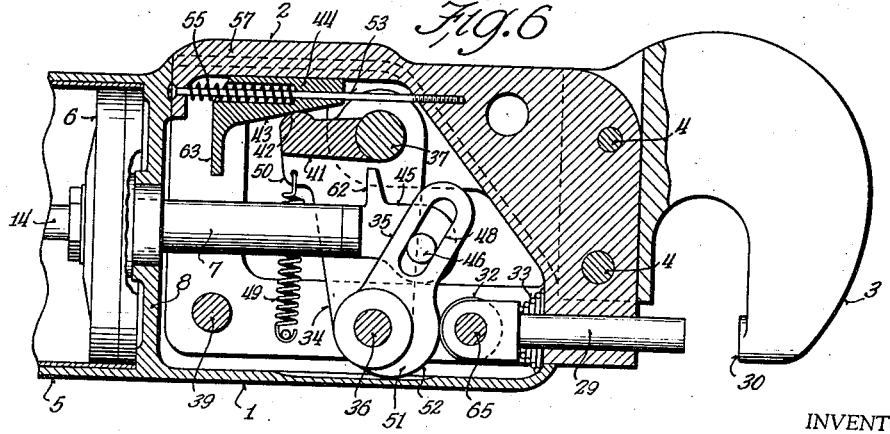
INVENTOR.
FRANK A. KAMAN
BY
ATTORNEY.

Patented June 13, 1944

2,351,049

UNITED STATES PATENT OFFICE 2,351,049

SQUEEZE RIVETER

Frank A. Kaman, Aurora, Ill., assignor to Independent Pneumatic Tool Company, Chicago, Ill., a corporation of Delaware Application December 26, 1941, Serial No. 424,461

8 Claims. (Cl. 78—48)

This invention relates to portable power operated riveting tools of the compression or squeeze riveter type for cold riveting operations as commonly employed in the airplane industry for driving aluminum and like rivets.

The principal object and purpose of my invention is to provide a riveting tool in which the riveting action automatically adjusts itself for rivets of different lengths. This does away with the maintenance of an exact distance between the end of the riveting plunger and yoke elements of the tool for a definite diameter and length of rivet. In other words, where the machines as heretofore employed must be converted to the particular length of the rivet by the manipulation of the plunger, yokes or rivet sets and then can be used only for that particular length of rivet without further manipulation, the riveter of my invention can drive rivets which vary in length within its range without any adjustments. This is a special advantage on production lines where simple and speedy methods are paramount in that the operator need only apply the machine to the rivet and set the machine in operation, the machine automatically bringing its riveting stroke into action for the particular length of rivet being driven.

In accordance with my invention the riveting plunger has a total stroke of a predetermined length, a portion of which is the riveting or power stroke and which power stroke can occur anywhere within the range of the total stroke. The plunger, during the course of its travel, has no power until it encounters a resistance on contact with the work, whereupon, the power stroke comes into action and builds up the pressure needed to drive a proper head on the rivet and securely clamp the plates being riveted together. In short, in accordance with my invention, the plunger has a "floating power stroke" which is inactive until called upon, and then occurs as soon as the plunger meets a resistance on contact with the work regardless of the length of the rivet.

The riveter of my invention, once set up for its range of jobs, needs no more interchanging of yokes and plungers. It requires no further tampering or adjusting for length variation of rivets. It obliterates the tedious problem of adjusting the riveter to its work and always supplies a correct power stroke.

In carrying out the objects of my invention, I provide a riveter in which the heavy pressure creating means for increasing the pressure on the plunger when in contact with the work is moved as a unit with the plunger by the power operated means of the tool until the plunger encounters the work, whereupon, the resistance offered to the plunger will automatically bring the heavy pressure creating means into action to project the plunger on its riveting stroke with the increased pressure required for a cold riveting operation regardless of the length of the rivet.

It is within the contemplation of my invention to accomplish the objects aforesaid by the use of a follower wedge which follows along with the plunger as it is moved up to the work and acts as a stop to set the heavy pressure creating means into action as soon as the plunger encounters a resistance on contact with the work.

Other and further objects of my invention will appear in the following specification taken in conjunction with the accompanying drawings in which—

Fig. 1 is a longitudinal sectional view with parts in elevation of a portable power operated riveting tool constructed in accordance with my invention;

Fig. 2 is a similar sectional view taken on line 2—2 of Fig. 1;

Fig. 2A is a sectional view showing the valve in one position of its movement;

Fig. 3 is a cross-sectional view with parts in elevation taken on line 3—3 of Fig. 1;

Fig. 4 is a fragmentary longitudinal sectional view with parts in elevation taken on line 4—4 of Fig. 1;

Fig. 5 is a view showing the action of the follower wedge to be hereinafter described; and Fig. 6 is a similar view showing the action of the tool on its riveting or power stroke.

The machine illustrated comprises a housing 1 mounting a frame 2 carrying a yoke 3 at the front end of the tool. Bolts 4 connect the yoke to the frame as shown in Figs. 1 and 2. A main power cylinder 5 containing a piston 6 on a piston rod 7 is at the end of the housing 1 opposite the yoke 3. An end wall 8 of the housing 1 closes the front end of the cylinder 5, the rear end of said cylinder being closed by a wall member 9 secured to the cylinder 5 by screws 10 as shown.

An auxiliary cylinder 11 containing a piston 12 extends rearwardly from the end wall 9 in coaxial alinement with the main cylinder 5. The cylinder 11 is smaller in diameter than the cylinder 5 and provides a hand hold for the tool. The cylinder 11 is closed at its rear end by a closure head 13 and the piston 12 in the cylinder 11 is fixed to an extension 14 of the piston rod 7 in the main cylinder 5. This provides for simultaneous movement of the two pistons.

The rod section 14 is provided with an axial passage 15 opening at its rear end into the cylinder 11 on the rear side of the piston 12 for supplying pressure fluid thereto. A port 16 connects the front end of the passage 15 with the cylinder 5 on the rear side of its piston 6 when the latter starts on its forward or power stroke. By this arrangement pressure fluid supplied to the main cylinder 5 will enter the auxiliary cylinder 11 and act simultaneously on the pistons of both cylinders to drive the pistons forwardly in unison. The flow of pressure fluid to and from the cylinders 5 and 11 is controlled by a manually operable throttle valve 17 mounted in the wall section 9 between the cylinders as shown in Figs. 2 and 2A.

The valve 17 in the embodiment shown is slidably mounted in the head section 9 and is moved endwise in one direction by an actuating lever 18 pivoted at 19 on the head section 9 and extending along the auxiliary cylinder 11 to be grasped therewith when holding the tool. The valve 17 is moved in the opposite direction by a spring (not shown) included in the valve assembly. The spring lowers the valve 17 to connect the front end of the auxiliary cylinder with the live air supply, while the lever 18 raises the valve to connect the rear end of the power cylinder 5 with said air supply. For this purpose, the forward end 20 of the lever 18 is pivoted to the upper end of the valve member 17 as indicated generally in Fig. 1. The control valve 17 follows the construction and operation of the corresponding valve shown and described in the co-pending application of F. P. Forss, Serial No. 306,254 filed November 27, 1939, and owned by the assignee of the instant application.

As shown in Figs. 2 and 2A, the valve 17 is provided with an inlet port 21 which connects with an inlet opening 22 in the head section 9 and to which opening the compressed air supply hose (not shown) for the tool is attached. When the valve 17 is raised to the position shown in Fig. 2, its port 23 connects the inlet port 21 to the rear end of the cylinder 5 through a passage 24 in the head section 9. At the same time the front end of the cylinder 11 exhausts through ports 25 and 26 in the valve and passages 27 and 28 in the head section 9. It is to be understood that these ports are separated from the first ones in a manner to function as herein described.

When the valve member 17 is lowered to the position shown in Fig. 2A, the port 21 connects the inlet opening 22 with the rear end of the cylinder 11 through the port 25 and the passage 27. The cylinder 5 at this time exhausts through ports 23 and 26 and passages 2⁴ and 28. The latter is the exhaust passage for the valve in both positions. With the arrangement as described, depressing the lever 18 drives the pistons forwardly, while releasing the lever returns the pistons to the beginning of their power strokes.

Slidably mounted in the frame 2 at the front end of the tool is a riveting plunger or ram 29 in opposition to an anvil 30 on the yoke 3 as shown herein. The plunger 29 extends into the housing 1 between the side walls 31, 31 of the frame 2 and there carries a roller 32 which by a coiled spring 33 about the plunger is pressed into contact with the periphery of a co-operating cam element to be presently described.

The mechanism embodying this cam element is located within the housing 1 between the side walls 31 of the frame 2 and is in part supported thereby as shown in Figs. 1 to 6. Said mechanism comprises a lever 34 and a link 35, both located between the side walls of the frame 2 and pivotally interconnected at their adjacent ends by a cross-pin 36. The opposite or upper end of the lever 34 is pivotally connected to the frame 2 by a fulcrum pin 37 which extends between and has its ends mounted in the side walls 31 of the frame. The ends of the pin 37 extend laterally beyond the frame and take into openings provided in the side walls 38, 38 of the housing 1 to hold the frame 2 within the housing when the parts are assembled as shown in the drawings. An additional cross-pin 39 is employed to hold the frame 2 within the housing 1.

The lever 34 and the link 35 are each of the bifurcated, one-piece type, the link 35 fitting between the arm portions 40 of the lever. The latter at its fulcrumed end is provided with an integral web portion 41 extending rearwardly from the fulcrum 37 and provided on its upper side at its outer end with a rounded lug projection 42 for engagement with the inclined under surface 43 of a movable follower wedge 44 to be presently described. It is to be understood that the lever 34 and the link 35 are located in the space between the forward end of the piston rod 7 and the rear end of the plunger 29 and serve to transmit the power of the rod 7 to the plunger 29 and also operate the cam to build up the pressure on the plunger on its riveting or power stroke. The rod 7 and the plunger 29 are arranged in parallelism with the rod 7 offset laterally to one side of the longitudinal axis of the plunger 29. With this arrangement the link 35 occupies the diagonal position shown in Fig. 1 at the beginning of the power stroke of the tool.

The rear end of the link 35 is pivotally connected to the forward end of the rod 7 through a connector 45 and a cross-pin 46. The side arms 47, 47 of the link 35 straddle the connector 45 and have elongated slots 48 to receive the opposite ends of the pin 46. The slots 48 provide for the swinging of the link 35 about its pivot pin 36 in the operation of the cam by the power of the tool. One or more coiled springs 49 are employed to normally swing the lower end of the lever 34 towards the plunger 29. Two of these springs 49 are disclosed in the embodiment herein, one at each side arm 40 of the lever 34 and connected at their upper ends thereto on to the rear of the fulcrum 37 and at their lower ends to the side walls 31 of the frame 2 below the line of movement of the connector 45. The side arms 40 of the lever 34 are provided below the web 41 with rearwardly extending lug portions 50, 50 to provide anchorages for the upper ends of the springs 49 as shown.

The link 35 is provided on its hub section about the pin 36 with an integral cam portion 51 having a curved cam surface 52 in eccentric relation to the pin 36. The cam surface 52 is on a gradually increasing curvature and is in constant contact with the roller 32 on the plunger 29 as shown in Fig. 2. The cam portion 51 acts to project the plunger forwardly on its riveting stroke at an increased pressure when operated by the pistons 6 and 12.

The follower wedge 44 which controls the action of the cam 51 is located within the frame 2 between its side walls 31 to the rear of the lever 34 and above the piston rod 7. A rod 53 mounts the follower wedge 44 in the frame 2 for movement in parallel with the rod 7 and the plunger 29. A recess 54 in the member 44 receives a coil spring 55 about the rod 53 for normally urging the follower wedge 44 towards the lever 34. The front end of the spring 55 seats against the bottom of the recess 54, while the rear end of the spring seats against a lug 56 formed integral with the top wall 57 of the frame 2 and in the path of movement of the wedge member 44. The rod 53 is anchored in the lug 56 and has its opposite end supported in a drilled hole in the front body portion 58 of the frame 2 above the fulcrum pin 37 as shown in Fig. 1. The wedge member 44 fits against the top wall 57 of the frame 2, the co-acting surfaces 59 and 60 of these parts being flat and parallel to the line of movement of the piston rod 7 and the plunger 29. The side walls 31 of the frame 2 may be cut out as at 61 to provide openings to reduce the weight of the frame and also facilitate reaching the parts therein when assembling and disassembling the tool. As indicated in the drawings, the frame 2 is insertable into the housing 1 through an opening at the front end of its side walls 38. The front end of the frame 2 closes this opening when the frame is in place as shown in Fig. 1. Similarly, the top wall 57 of the frame 2 closes the upper part of the housing 1 when the parts are assembled as shown in Fig. 3.

The piston rod 7 and the follower wedge 44 have coacting abutments 62, 63. The abutment 62 extends upwardly from the connector 45 and lies in the path of movement of the abutment 63. The latter is carried by the follower wedge 44 as a tail piece and extends downwardly therefrom as shown. The follower wedge 44 is at the lug 56 at the rear end of the frame 2 at the start of the forward stroke of the pistons and the abutment 63 on the wedge member 44 lies on the rear side of the abutment 62 on the connector 45 as shown in Fig. 1. The purpose of the construction will presently appear.

The operation of the machine shown and described is as follows: The piston 6 is brought to the beginning of its power stroke by admitting pressure fluid to the front end of the auxiliary cylinder 11. This brings the pistons 6 and 12 to the rear ends of their respective cylinders. The rod 7 in this rearward movement of the pistons moves the lever 34 and its connected link 35 to the positions shown in Fig. 1. At the same time the rod 7 moves the follower wedge 44 to its rearmost position due to the action of the abutment 62 on the abutment 63. The tool is now applied over the rivet to be set with the head of the rivet against the anvil 30 of the yoke 3 and the shank of the rivet opposed to and in line with the plunger 29 as is well understood in this art. The plunger 29 is out of contact with the shank end of the rivet because the clearance space between the anvil and the plunger is sufficient to accommodate the longest rivet within the range for which the machine is designed.

Power is now applied to move the pistons forwardly and the first action is to move the link and lever 34, 35 and the plunger 29 forwardly as a unit until the plunger encounters the work, that is, the shank end of the rivet. This movement takes place rapidly as there is no resistance to hinder the unitary movement of the parts. During this movement the lower end of the lever 34 is moved forwardly and the wedge member 44 follows along to take up the enlarging space between the lug projection 42 at the upper end of the lever and the opposed wall surface 60 of the frame 2. As soon as the plunger 29 contacts with the work, which is the position of the parts shown in Fig. 5, the follower wedge 44 holds the lever 34 against rearward movement and the continued forward movement of the rod 7 swings the link 35 on its pin 36 as shown in Fig. 6. This rotates the cam 51 against the roller 32 and drives the plunger 29 forwardly on its riveting or power stroke at an increased pressure to properly upset the end of the rivet shank against the plates to be riveted and securely clamp them together. The riveting pressure is increased due to the eccentric shape of the cam and proper setting of the rivet is obtained at the end of the plunger stroke. At the termination of the riveting stroke the power is reversed and the parts are returned to their starting positions.

Due to the follower wedge 44 it is apparent that the riveting machine of my invention will automatically set itself without manual adjustment of any kind to rivets of various lengths within the range provided for the machine. The wedge in following along with the lever 34 automatically sets the pressure increasing means for action as soon as the plunger 29 encounters a resistance on contact with the work and this occurs regardless of the length of the rivet. In all cases, as hereinbefore pointed out, the plunger during the course of its travel has no power until it encounters some resistance, and upon meeting a resistance, its power stroke comes into action and builds up the necessary riveting pressure. It is this action which produces the "floating power stroke" which is inactive until called upon whatever the length of the rivet.

In the riveter of the present embodiment, the design is such that the total stroke of the plunger 29 is approximately $\frac{5}{8}''$ and with the follower wedge or compensator as herein disclosed the machine can drive rivets with a variation in length of $\frac{3}{8}''$. The machine has a power stroke of $\frac{1}{32}''$, but this power stroke can work anywhere within the range of the total stroke. The plunger 29 during the course of its travel has no power until it encounters the rivet and upon encountering this resistance the power stroke comes into action and builds up the pressure as above described. The dimensions given are by way of illustration and not by way of limitation.

The riveter may be equipped with a safety or pop-off valve (not shown) to guard against applying excessive crushing pressure to small diameter rivets. This valve is adjustable so that its blow-off pressure can be regulated. My invention as herein disclosed is also applicable to riveters of a single cylinder type, that is, which do not employ an auxiliary cylinder to return the pistons to the start of their power strokes. In these machines, the porting and the control valve are so constructed and arranged that the power piston is moved in opposite directions by pressure fluid supplied alternately to the opposite sides thereof. It is to be also understood, that any desired type of control valve means may be employed with my invention for supplying the pressure to and exhausting it from the power applying means of the tool.

If desired the side walls 31 of the frame 2 may be provided with slots 64, 64 to guide the ends of the pin 65 which mounts the roller 32 at the inner end of the plunger 29 as shown in Fig. 4. To facilitate ease of operation roller or equivalent anti-friction bearings may be employed at the pivotal connection between the lever 34 and the link 35 about the pin 36 and also at the pin 65 for the roller 32.

The details of construction and arrangement of parts shown and described may be variously changed and modified without departing from the spirit and scope of my invention, except as pointed out in the annexed claims.

I claim as my invention:

1. In a riveting machine for setting rivets of different lengths, a support, an anvil carried thereby, a riveting plunger slidably mounted on said support, a member movably mounted on the support rearwardly of the plunger, power multiplying means carried by said member and operable on said plunger, power actuated means on the support for moving said member and said plunger as a unit until the plunger grips the rivet between itself and the anvil and thereafter operating said power multiplying means to increase the pressure of the plunger on the rivet to upset the same, and power biased stop means movably mounted on the support independently of and following along with the member as the plunger is engaged with the rivet to hold the member against reverse movement upon the operation of the power multiplying means on the plunger to upset the rivet to compensate for rivets of different lengths.

2. In a riveting machine for setting rivets of different lengths, a support, an anvil carried thereby, a riveting plunger slidably mounted on said support, a lever pivoted at one end on the support, a link pivoted to the other end of the lever, cam means carried by the link in eccentric relation to its pivotal connection with the lever and operable on the plunger, power actuated means on the support connected with the link for moving the same and the plunger as a unit until the plunger grips the rivet between itself and the anvil and thereafter rotating the link to bring the cam means into action on the plunger to increase the pressure thereof on the rivet to upset the same, and movably mounted stop means on the support interacting with the lever and the support and following along with the lever as the plunger is engaged with the rivet to hold the lever against reverse movement upon the operation of the cam means on the plunger to upset the rivet to compensate for rivets of different lengths.

3. In a riveting machine for setting rivets of different lengths, a support, an anvil carried thereby, a riveting plunger slidably mounted on said support, a lever pivoted at one end on the support and having a rigid projection in spaced relation to the support, power multiplying means carried by the lever at its other end and operable on the plunger, power actuated means on the support for moving the lever and the plunger as a unit until the plunger grips the rivet between itself and the anvil and thereafter operating the power multiplying means to increase the pressure of the plunger on the rivet to upset the same, and a spring biased wedge member movably mounted on the support and following along with the lever to take up the space between the projection and the support as the plunger is engaged with the rivet to hold the lever against reverse movement upon the operation of the power multiplying means on the plunger to upset the rivet to compensate for rivets of different lengths.

4. In a riveting machine for setting rivets of different lengths, a support, an anvil carried thereby, a riveting plunger slidably mounted on the support and having a rigid projection in spaced relation to the support, power multiplying means carried by the lever at its other end and operable on the plunger, power actuated means on the support for moving the lever and the plunger as a unit until the plunger grips the rivet between itself and the anvil and thereafter operating said power multiplying means to increase the pressure of the plunger on the rivet to upset the same, and a spring biased wedge member movably mounted on the support and following along with the lever to take up the space between the projection and the support as the plunger is engaged with the rivet to hold the lever against reverse movement upon the operation of the power multiplying means on the plunger to upset the rivet to compensate for rivets of different lengths, said wedge member having operative guiding and inclined surfaces between and in contact with the support and the projection, respectively.

5. In a riveting machine for setting rivets of different lengths, a support, an anvil carried thereby, a riveting plunger slidably mounted on said support, a lever fulcrumed at one end on the support and having a rigid projection in spaced relation to the support, power multiplying means carried by the lever at its other end and operable on the plunger, power actuated means on the support for moving the lever and the plunger as a unit until the plunger grips the rivet between itself and the anvil and thereafter operating said power multiplying means to increase the pressure of the plunger on the rivet to upset the same, a spring biased wedge member movably mounted on the support and following along with the lever to take up the space between the projection and the support as the plunger is engaged with the rivet to hold the lever against reverse movement upon operation of the power multiplying means on the plunger to upset the rivet to compensate for rivets of different lengths, and guide means on the support to support the wedge member and the spring therefor.

6. In a riveting machine for setting rivets of different lengths, a support, an anvil carried thereby, a riveting plunger slidably mounted on said support, a lever fulcrumed at one end on the support, power multiplying means carried by the lever at its other end and operable on the plunger, a power actuated element on the support for moving the lever and the plunger as a unit until the plunger grips the rivet between itself and the anvil and thereafter operating said power multiplying means to increase the pressure of the plunger on the rivet to upset the same, a movably mounted spring biased wedge member on the support interacting with the lever and the support as the plunger is engaged with the rivet to hold the lever against reverse movement upon the operation of the power multiplying means on the plunger to upset the rivet to compensate for rivets of different lengths, and coacting means on the wedge member and the element to return the wedge member to its starting position on the return movement of the element.

7. In a riveting machine for setting rivets of different lengths, a support, an anvil carried thereby, a riveting plunger slidably mounted on said support, a lever pivoted at one end on the support, a link pivoted to the other end of the lever, cam means carried by the link in eccentric relation to its pivotal connection with the lever and operable on the plunger, power actuated means on the support having a lost motion connection with the link for moving the lever and the plunger as a unit until the plunger grips the rivet between itself and the anvil and thereafter rotating the link to bring the cam means into action on the plunger to increase the pressure thereof on the rivet to upset the same, a movably mounted wedge member on the support interacting with the support and the lever and following along with the lever as the plunger is engaged with the rivet to hold the lever against reverse movement upon the operation of the cam means on the plunger to upset the rivet to compensate for rivets of different lengths and spring means, one for urging the wedge member towards the lever, and the other for holding the plunger against the cam means.

8. In a riveting machine for setting rivets of different lengths, a support, an anvil carried thereby, a riveting plunger slidably mounted on said support, a lever pivoted at one end on the support, a link pivoted to the other end of the lever, cam means carried by the link in eccentric relation to its pivotal connection with the lever and operable on the plunger, a power actuated rod movably mounted on the support and connected with the link for moving the same and the lever as a unit until the plunger grips the rivet between itself and the anvil and thereafter rotating the link to bring the cam means into action on the plunger to increase the pressure thereof on the rivet to upset the same, a movably mounted spring biased wedge member on the support interacting with the lever and the support and following along with the lever as the plunger is engaged with the rivet to hold the lever against reverse movement upon the operation of the cam means on the plunger to upset the rivet to compensate for rivets of different lengths, said wedge member being offset from the rod, and cooperating projections on the wedge member and the rod extending into the path of each other for returning the wedge member to its starting position on the return movement of the rod and permitting the wedge member to move with the rod on its power stroke towards the plunger.

FRANK A. KAMAN.